(12) United States Patent
Yoshida et al.

(10) Patent No.: US 10,911,983 B2
(45) Date of Patent: Feb. 2, 2021

(54) PACKET LOAD GENERATION DEVICE AND PACKET LOAD GENERATION METHOD

(71) Applicant: FUJITSU LIMITED, Kawasaki (JP)

(72) Inventors: Eitatsu Yoshida, Fukuoka (JP); Wataru Nakamura, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/211,286

(22) Filed: Dec. 6, 2018

(65) Prior Publication Data

US 2019/0182708 A1 Jun. 13, 2019

(30) Foreign Application Priority Data

Dec. 8, 2017 (JP) ................................. 2017-236488

(51) Int. Cl.
*H04W 28/06* (2009.01)
*H04L 12/741* (2013.01)
*H04L 12/26* (2006.01)

(52) U.S. Cl.
CPC ....... *H04W 28/065* (2013.01); *H04L 43/0847* (2013.01); *H04L 43/50* (2013.01); *H04L 45/745* (2013.01)

(58) Field of Classification Search
CPC .. H04W 24/08; H04W 28/065; H04L 45/745; H04L 43/00; H04L 43/067; H04L 43/062
See application file for complete search history.

(56) References Cited

U.S. PATENT DOCUMENTS

| | | | |
|---|---|---|---|
| 2002/0009134 A1 | 1/2002 | Fischel et al. | |
| 2006/0171353 A1* | 8/2006 | Nagata | H04L 1/1887 370/329 |
| 2011/0099446 A1* | 4/2011 | Murakami | H04L 1/0041 714/748 |
| 2013/0039189 A1* | 2/2013 | Sugiyama | H04L 61/2061 370/241 |
| 2018/0062964 A1* | 3/2018 | Suzuki | H04L 43/10 |

FOREIGN PATENT DOCUMENTS

| | | |
|---|---|---|
| JP | 2003-524324 | 8/2003 |
| JP | 2012-156853 | 8/2012 |

* cited by examiner

*Primary Examiner* — Gregory B Sefcheck
*Assistant Examiner* — Debebe A Asefa
(74) *Attorney, Agent, or Firm* — Fujitsu Patent Center

(57) ABSTRACT

A packet load generation device includes a memory configured to store a first packet group including a first plurality of packets, a transmission buffer configured to store a second packet group including a second plurality of packets, and a processor configured to sequentially transmit the first plurality of packets to the transmission buffer, sequentially transmit the second plurality of packets to a terminal, calculate a first time period for transmitting all the second plurality of packets included in the second packet group to the terminal, perform a comparison between the first time period with a second time period for adding a third plurality of packets to the first packet group, and perform addition of the third plurality of packets to the first packet group when it is detected that the first time period is longer than the second time period.

15 Claims, 14 Drawing Sheets

FIG. 4

| TRANSMISSION PORT | | | Port0 |
|---|---|---|---|
| PACKET TO BE TRANSMITTED | PACKET LENGTH | | 64Byte |
| | L4 PROTOCOL | | TCP |
| | SOURCE IP ADDRESS | MINIMUM VALUE | 192.168.0.1 |
| | | MAXIMUM VALUE | 192.168.255.255 |
| | DESTINATION IP ADDRESS | MINIMUM VALUE | 192.170.1.1 |
| | | MAXIMUM VALUE | 192.170.255.255 |
| | SOURCE PORT NUMBER | MINIMUM VALUE | 40001 |
| | | MAXIMUM VALUE | 49999 |
| | DESTINATION PORT NUMBER | MINIMUM VALUE | 50001 |
| | | MAXIMUM VALUE | 59999 |
| | CYCLE | | INCREMENT |
| TRANSMISSION RATE | | | 100.0% |

FIG. 5

| TRANSMISSION PORT | | | Port0 |
|---|---|---|---|
| PACKET TO BE TRANSMITTED | SOURCE IP ADDRESS | CURRENT MAXIMUM VALUE | 192.168.3.232 |
| | DESTINATION IP ADDRESS | CURRENT MAXIMUM VALUE | 192.170.3.232 |
| | SOURCE PORT NUMBER | CURRENT MAXIMUM VALUE | 41000 |
| | DESTINATION PORT NUMBER | CURRENT MAXIMUM VALUE | 51000 |
| NUMBER OF PACKETS TO BE REWRITTEN | | | 10 |
| REWRITING DESTINATION INTRA-POOL INDEX | | | 0 |

FIG. 6

| NUMBER (CUMULATIVE NUMBER) OF RECORDS | | 75 |
|---|---|---|
| NUMBER (NUMBER OF TABLE RECORDS) OF RECORDS | | 10 |
| MEASURED RESULTS [ns] | 1 | 2010 |
| | 2 | 1990 |
| | 3 | 2211 |
| | ... | ... |
| | 10 | 2000 |
| MEASURED MAXIMUM VALUE | | 2211 |

FIG. 7

| NUMBER (CUMULATIVE NUMBER) OF RECORDS | | 15 |
|---|---|---|
| NUMBER (NUMBER OF TABLE RECORDS) OF RECORDS | | 10 |
| MEASURED RESULTS [ns] | 1 | 9800 |
| | 2 | 10000 |
| | 3 | 10100 |
| | ... | ... |
| | 10 | 10050 |
| MEASURED MAXIMUM VALUE | | 10100 |

FIG. 9A

| PACKET LENGTH | 64Byte |
|---|---|
| L4 PROTOCOL | TCP |
| SOURCE IP ADDRESS | 192.168.0.1 TO 192.168.3.232 |
| DESTINATION IP ADDRESS | 192.170.1.1 TO 192.170.3.232 |
| SOURCE PORT NUMBER | 40001 TO 41000 |
| DESTINATION PORT NUMBER | 50001 TO 51000 |

FIG. 9B

| PACKET LENGTH | 64Byte |
|---|---|
| L4 PROTOCOL | TCP |
| SOURCE IP ADDRESS | 192.168.0.11 TO 192.168.3.242 |
| DESTINATION IP ADDRESS | 192.170.1.11 TO 192.170.3.242 |
| SOURCE PORT NUMBER | 40011 TO 41010 |
| DESTINATION PORT NUMBER | 50011 TO 51010 |

FIG. 10

| PACKET TO BE TRANSMITTED | TRANSMISSION PORT | | Port0 |
|---|---|---|---|
| | SOURCE IP ADDRESS | CURRENT MAXIMUM VALUE | 192.168.3.232 |
| | DESTINATION IP ADDRESS | CURRENT MAXIMUM VALUE | 192.170.3.232 |
| | SOURCE PORT NUMBER | CURRENT MAXIMUM VALUE | 41010 |
| | DESTINATION PORT NUMBER | CURRENT MAXIMUM VALUE | 51010 |
| NUMBER OF PACKETS TO BE REWRITTEN | | | 10 |
| REWRITING DESTINATION INTRA-POOL INDEX | | | 10 |

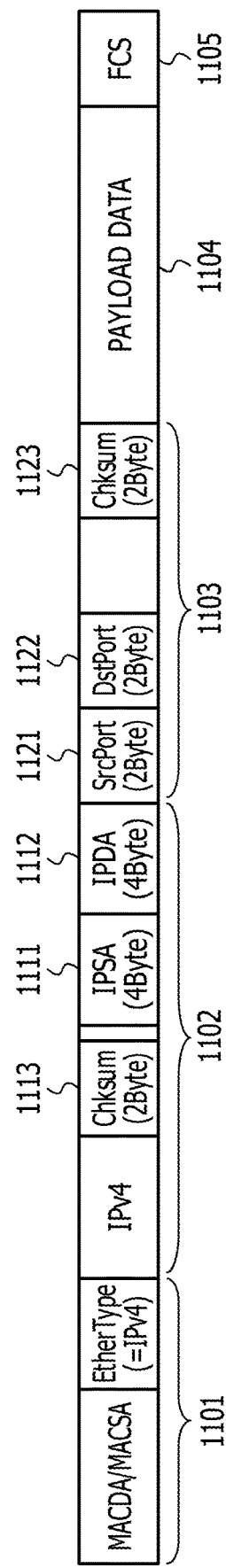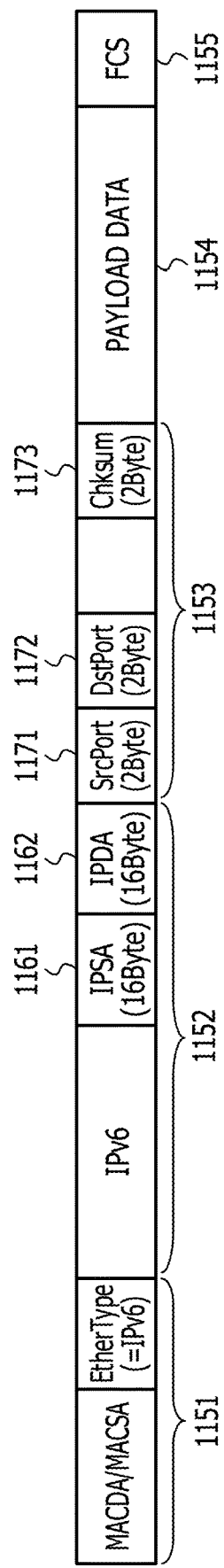

PACKET LOAD GENERATION DEVICE AND PACKET LOAD GENERATION METHOD

CROSS-REFERENCE TO RELATED APPLICATION

This application is based upon and claims the benefit of priority of the prior Japanese Patent Application No. 2017-236488, filed on Dec. 8, 2017, the entire contents of which are incorporated herein by reference.

FIELD

The embodiments discussed herein are related to a technique for generating a packet load.

BACKGROUND

A packet load generation device transmits packets to a device to be tested and thereby applies a load to the device to be tested and is used to evaluate communication performance related to a network of the device to be tested. Operations of the packet load generation device are described. First, the packet load generation device registers as many packets as possible in a packet pool included in the packet load generation device based on the capacity of the packet pool for storing packets to be transmitted. Next, the packet load generation device transmits a predetermined number of packets among the packets registered in the packet pool to a transmission buffer included in a network interface card (NIC). Then, the NIC transmits the packets stored in the transmission buffer to the device to be tested.

The packet load generation device repeatedly executes a process of transmitting a packet from the packet pool to the transmission buffer included in the NIC and a process of transmitting a packet stored in the transmission buffer to the device to be tested and transmits packets registered in the packet pool to the device to be tested. Then, after the packet load generation device completes the transmission of multiple packets, the packet load generation device registers as many packets as possible in the packet pool again. After that, the packet load generation device repeatedly executes a process of transmitting a packet from the packet pool to the transmission buffer included in the NIC and a process of transmitting a packet stored in the transmission buffer to the device to be tested and transmits packets to the device to be tested and applies a load to the device to be tested.

Examples of related art are Japanese National Publication of International Patent Application No. 2003-524324 and Japanese Laid-open Patent Publication No. 2012-156853.

SUMMARY

According to an aspect of the embodiments, a packet load generation device includes a memory configured to store a first packet group including a first plurality of packets, a transmission buffer configured to store a second packet group including a second plurality of packets, and a processor configured to sequentially transmit the first plurality of packets to the transmission buffer, sequentially transmit the second plurality of packets to a terminal, calculate a first time period for transmitting all the second plurality of packets included in the second packet group to the terminal, perform a comparison between the first time period with a second time period for adding a third plurality of packets to the first packet group, and perform addition of the third plurality of packets to the first packet group when it is detected that the first time period is longer than the second time period.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of transmission packet information;

FIG. 5 is a diagram illustrating an example of packet pool rewriting information;

FIG. 6 is a diagram illustrating an example of packet transmission API execution time information;

FIG. 7 is a diagram illustrating an example of rewriting execution time information;

FIGS. 9A and 9B are diagrams describing packets to be transmitted by the information processing device;

FIG. 10 is a diagram illustrating an example of the packet pool rewriting information after rewriting;

FIGS. 11A and 11B are diagrams describing packet formats and fields targeted for rewriting;

DESCRIPTION OF EMBODIMENTS

After the packet load generation device described in BACKGROUND transmits all packets registered in the packet pool to the transmission buffer included in the NIC, the packet load generation device described in BACKGROUND registers multiple packets in the packet pool based on the capacity of the packet pool again. Thus, it may take time to register the packets in the packet pool again, and a packet to be transmitted from the NIC to the device to be tested may not exist during the registration. When a packet to be transmitted from the NIC to the device to be tested does not exist, there is a time period in which a packet is not transmitted to the device to be tested, and the efficiency of the packet transmission is reduced.

Hereinafter, embodiments are described.

First Embodiment

A first embodiment is described below.

Figure 1:
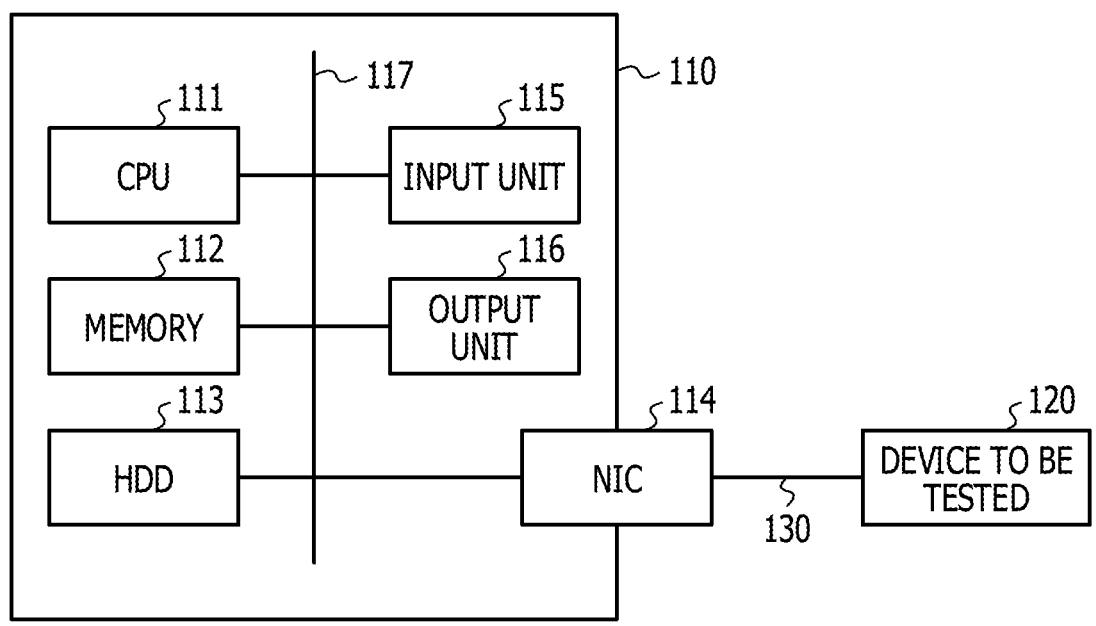
FIG. 1 is a diagram illustrating an example of a hardware configuration of an information processing device according to a first embodiment.

FIG. 1 is a diagram illustrating an example of a hardware configuration of an information processing device according to the first embodiment. An information processing device 110 illustrated in FIG. 1 includes a central processing unit (CPU) 111, a memory 112, a hard disk drive (HDD) 113, a network interface card (NIC) 114, an input unit 115, and an output unit 116, which are connected to each other via a bus 117. The information processing device according to the first embodiment is not limited to the configuration illustrated in FIG. 1 and may include a driving device for a storage medium. The information processing device is an example of a packet load generation device.

An operating system (OS) and an application program for executing various processes are stored in the HDD 113. The OS and the application program are read from the HDD 113 into the memory 112 when the OS and the application program are executed by the CPU 111. The CPU 111 controls the NIC 114, the output unit 116, and the like and causes the NIC 114, the output unit 116, and the like to execute predetermined operations in accordance with multiple instructions included in the application program. Data that is being processed is mainly stored in the memory 112, but may be stored in the HDD 113.

The NIC 114 is connected via, for example, a network communication line 130 to a device 120 to be tested. The information processing device 110 transmits a packet to the device 120 to be tested when the information processing device 110 operates as the packet load generation device. The device 120 to be tested is an example of another information processing device. The device 120 to be tested is, for example, a network monitoring device such as firewall, a load balancer, an intrusion detection system (IDS), an intrusion prevention system (IPS), or the like. Alternatively, the device 120 to be tested may be a network device such as a switch, a router, or a network address translation (NAT), for example. The input unit 115 receives information entered based on a user operation, for example. The output unit 116 outputs information to an external of the information processing device 110.

In this example, a packet load generation application program is read from, for example, a portable computer-readable storage medium and installed in the HDD 113. The packet load generation application program may be installed in the HDD 113 via a network such as the Internet or Ethernet (registered trademark) and the NIC 114. The information processing device 110 according to the first embodiment causes hardware such as the CPU 111 and the memory 112 and software such as the OS and the application program to closely collaborate with each other, thereby enabling various functions including a function as the packet load generation device.

Figure 2:
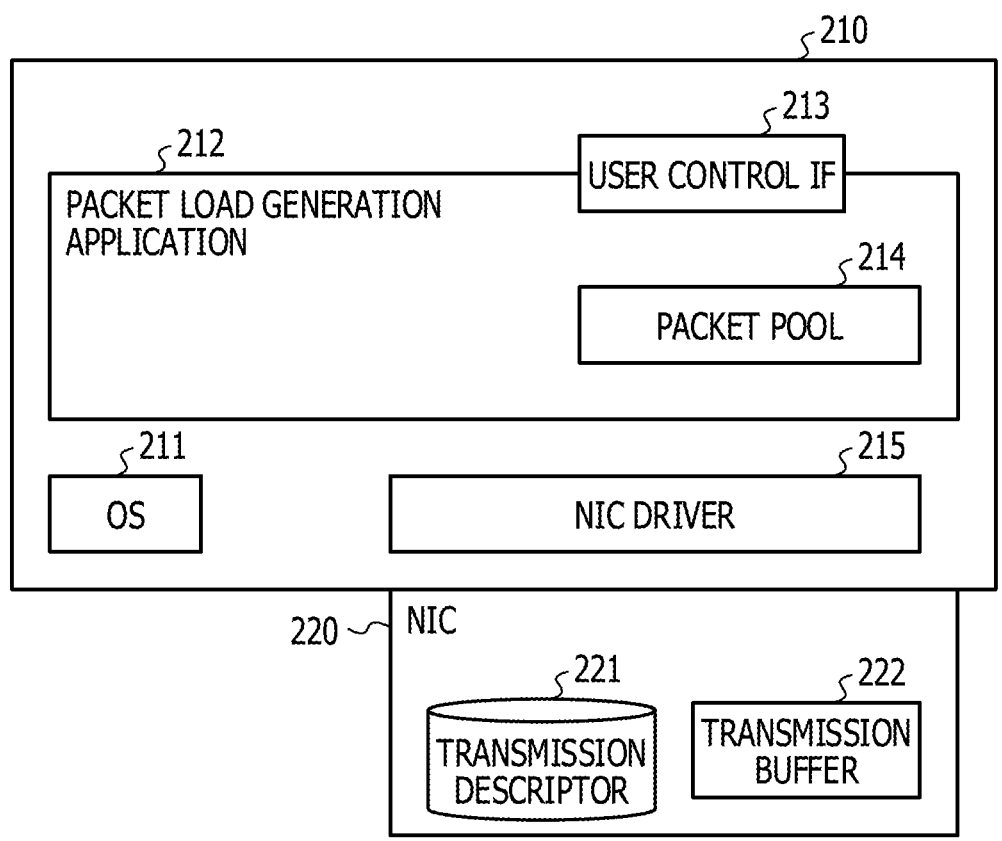
FIG. 2 is a diagram illustrating an example of a software configuration of the information processing device according to the first embodiment.

FIG. 2 is a diagram illustrating an example of a software configuration of the information processing device according to the first embodiment. FIG. 2 illustrates a configuration related to a process of generating a packet load. In a CPU 210 included in the information processing device according to the first embodiment, an OS 211 for managing an entire system, a packet load generation application 212 for executing the process of generating a packet load, and an NIC driver 215 for controlling the NIC 114 are executed.

The packet load generation application 212 uses a user control interface 213 to receive various settings, various instructions, and the like from a user and executes processes or the like based on the received settings, the received instructions, and the like. In addition, the packet load generation application 212 controls and manages a packet pool 214 for storing packets to be transmitted and gives an instruction to the NIC driver 215 in the process of generating a packet load.

The NIC driver 215 causes information of a packet to be transmitted to be stored in a transmission descriptor (queue) 221 of an NIC 220 in accordance with an instruction from the packet load generation application 212 and requests the packet load generation application 212 to transfer a packet from the packet pool 214 to a transmission buffer 222 of the NIC 220. In addition, the NIC driver 215 acquires, from the transmission descriptor (queue) 221, the number (hereinafter referred to as number of packets remaining in the queue) of remaining packets to be transmitted and gives the acquired number to the packet load generation application 212 in accordance with an instruction from the packet load generation application 212.

Figure 3:
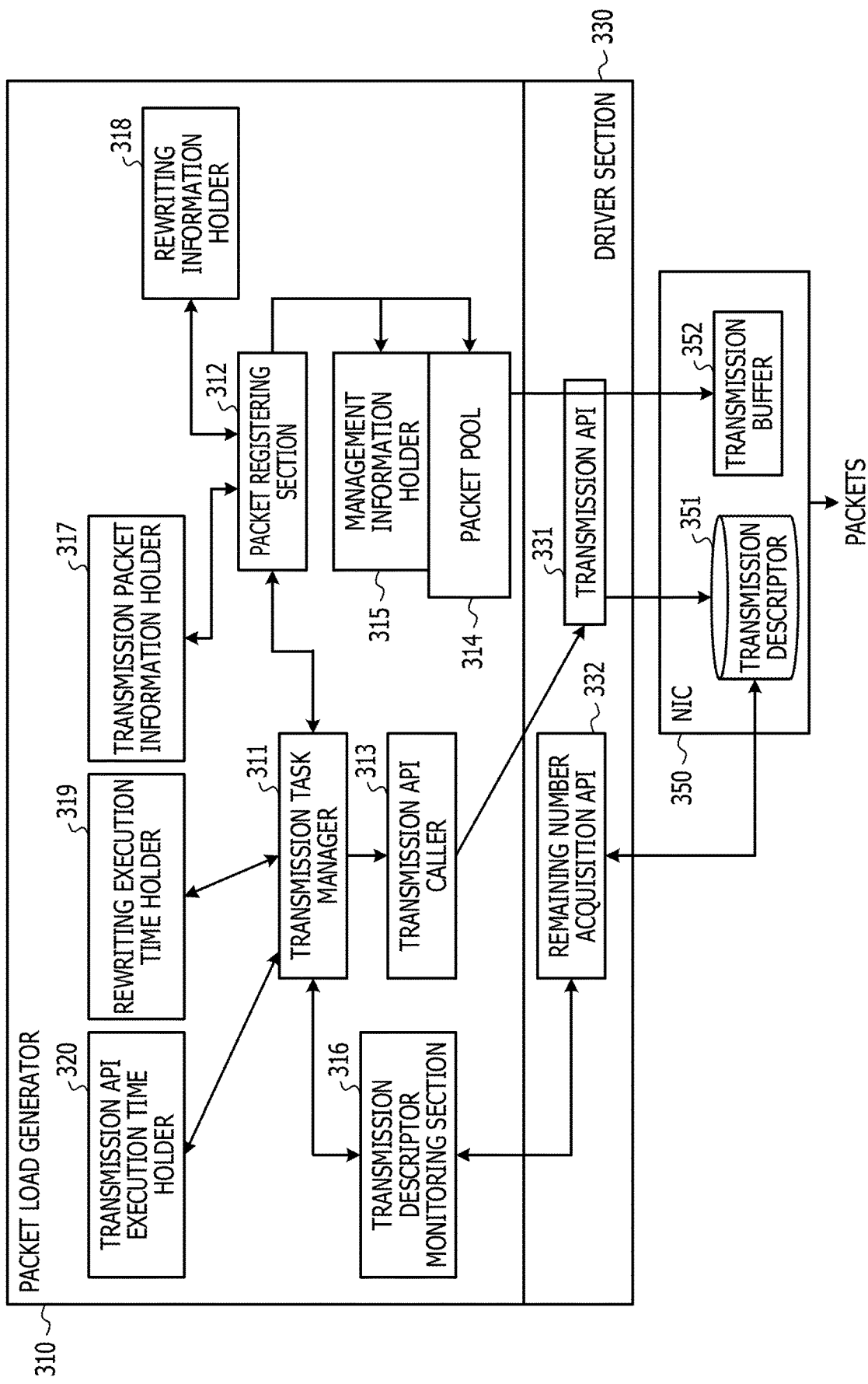
FIG. 3 is a diagram illustrating an example of a functional configuration of the information processing device according to the first embodiment.

FIG. 3 is a diagram illustrating an example of a functional configuration of the information processing device according to the first embodiment. FIG. 3 illustrates a configuration related to the process of generating a packet load. The information processing device according to the first embodiment includes a packet load generator 310, a driver section 330, and an NIC 350.

The packet load generator 310 includes a transmission task manager 311, a packet registering section 312, a transmission application programming interface (API) caller 313, a packet pool 314, and a management information holder 315. The packet load generator 310 also includes a transmission descriptor monitoring section 316, a transmission packet information holder 317, a packet pool rewriting information holder 318, a rewriting execution time holder 319, and a transmission API execution time holder 320.

The driver section 330 includes a transmission API 331 for packet transmission and a remaining number acquisition API 332 for acquiring the number of packets remaining in the queue. The NIC 350 is an example of a communication processing unit and includes a transmission descriptor (queue) 351 for storing information of a packet to be transmitted and a transmission buffer 352 for storing a packet to be transmitted.

The transmission task manager 311 executes control related to packet transmission to be executed in the process of generating a packet load. The transmission task manager 311 is an example of a manager. The transmission task manager 311 instructs the packet registering section 312 to register (rewrite) a packet to be transmitted and instructs the transmission API caller 313 to transmit a packet, for example. When the transmission task manager 311 determines that CPU extra time calculated based on information acquired from the transmission descriptor monitoring section 316 and the transmission API execution time holder 320 is longer than a time period, acquired from the rewriting execution time holder 319, for rewriting the packet pool, the transmission task manager 311 instructs the packet registering section 312 to register (rewrite) a packet to be transmitted. The CPU extra time is a time period up to the time when the transmission of an unsent packet from the NIC 350 to the device 120 to be tested is completed.

The packet registering section 312 registers a packet to be transmitted in the packet pool 314 based on transmission packet information held in the transmission packet information holder 317. In addition, the packet registering section 312 updates packet management information held in the management information holder 315 and packet pool rewriting information held in the rewriting information holder 318 in response to the registration (rewriting) of a packet in the packet pool 314. The packet registering section 312 is an example of a registering section. The packet registering section 312 registers (rewrites) a packet in the packet pool 314 when the process of generating a packet load is started (initially started) and when a registration instruction is received from the transmission task manager 311. This example assumes that, in the rewriting of the packet pool 314 in accordance with a registration instruction from the transmission task manager 311, 10 packets are rewritten in accordance with a single registration instruction as an example.

The transmission API caller 313 receives, from the transmission task manager 311, an instruction to transmit a packet and calls the transmission API 331 of the driver section 330. The packet pool 314 is an example of a storage section and is configured to store a packet to be transmitted. The number of packets to be stored in the packet pool 314 is arbitrary. In this example, up to 1000 packets are stored in the packet pool 314. The management information holder 315 holds packet management information such as a read index of the packet pool. The transmission descriptor monitoring section 316 acquires, from the transmission descriptor (queue) 351 via the remaining number acquisition API 332 of the driver 330, the number (or the number of packets remaining in the queue) of remaining packets to be transmitted.

The transmission packet information holder 317 holds transmission packet information set by a user. FIG. 4 illustrates an example of the transmission packet information. In this example, as the transmission packet information, a length of a packet to be transmitted, the type of a layer 4 (L4) protocol of the packet, a source Internet Protocol (IP) address of the packet, a destination IP address of the packet, a source port number of the packet, a destination port number of the packet, and information of a cyclic definition thereof are stored. In addition, as the transmission packet information, information of a rate of transmitting the packet from the information processing device is stored. The packet to be transmitted is stored in the packet pool 314 in accordance with the transmission packet information.

Each of the source IP address, destination IP address, source port number, and destination IP number of the packet to be transmitted defines the minimum settable value and the maximum settable value and is changed in accordance with the cyclic definition. For example, as illustrated in FIG. 4, when a cyclic definition indicates increment, all of a source IP address, a destination IP address, a source port number, and a destination IP number are incremented by 1 for each of packets to be transmitted. In this example, all of a source IP address of a packet to be transmitted, a destination IP address of the packet to be transmitted, a source port number of the packet to be transmitted, and a destination IP number of the packet to be transmitted are incremented by 1 for each of packets to be transmitted. However, one or more of a source IP address, a destination IP address, a source port number, and a destination IP number may be incremented by 1 for each of packets to be transmitted.

The packet pool rewriting information holder 318 holds the packet pool rewriting information. The packet pool rewriting information indicates the progress of the rewriting of packets to the packet pool 314. FIG. 5 illustrates an example of the packet pool rewriting information. In this example, the maximum value of a source IP address of a packet registered in the packet pool 314 and to be transmitted, the maximum value of a destination IP address of the packet, the maximum value of a source port number of the packet, the maximum value of a destination port number of the packet, the number of packets to be rewritten once, and a rewriting destination intra-pool index indicating a next rewriting destination are stored as the packet pool rewriting information. The packet pool rewriting information is updated by the packet registering section 312 in response to the rewriting of the packet pool 314.

The rewriting execution time holder 319 holds rewriting execution time information of the packet pool. FIG. 7 illustrates an example of the rewriting execution time information. In this example, as the rewriting execution time information, the latest 10 time periods for executing a process of rewriting 10 packets stored in the packet pool 314 and to be transmitted are stored. The maximum value among the rewriting time periods stored in the rewriting execution time holder 319 is used for the calculation of the CPU extra time.

The transmission API execution time holder 320 holds packet transmission API execution time information. FIG. 6 illustrates an example of the packet transmission API execution time information. In this example, as the packet transmission API execution time information, the latest 10 time periods for executing a transmission process by the transmission API 331 are stored. The maximum value among transmission API execution time stored in the transmission API execution time holder 320 is used for the calculation of the CPU extra time.

Although the maximum value among rewriting execution time and the maximum value among transmission API execution time are used for the calculation of the CPU extra time, the calculation is not limited to this. Arbitrary values obtained by referencing the rewriting execution time stored in the rewriting execution time holder 319 and the transmission API execution time stored in the transmission API execution time holder 320 may be applied. For example, an average value or intermediate value of the rewriting execution time and an average value or intermediate value of the transmission API execution time may be used. In addition, a value among the rewriting execution time and a value among the transmission API execution time may not be of the same type. For example, one of the value among the rewriting execution time and the value among the transmission API execution time may be the maximum value among the execution time, and the other of the value among the rewriting execution time and the value among the transmission API execution time may be an average value of the execution time.

Return to FIG. 3. The transmission API 331 causes information of a packet to be transmitted to be stored in the transmission descriptor (queue) 351 of the NIC 350 and transfers the packet from the packet pool 314 to the transmission buffer 352 of the NIC 350. The transmission API 331 is an example of a transmitter. The number of packets to be transferred by the transmission API 331 to the NIC 350 in response to a single call to the transmission API 331 is arbitrary. In this example, when the transmission API 331 is called, 32 packets to be transmitted are transferred by the transmission API 331 to the NIC 350. The transfer of packets from the packet pool 314 to the transmission buffer 352 of the NIC 350 is executed by direct memory access (DMA) transfer by the NIC 350, for example.

The remaining number acquisition API 332 acquires, from the transmission descriptor (queue) 351 of the NIC 350, the number (or the number of packets remaining in the queue) of remaining packets to be transmitted and notifies the transmission descriptor monitoring section 316 of the acquired number.

Figure 8:
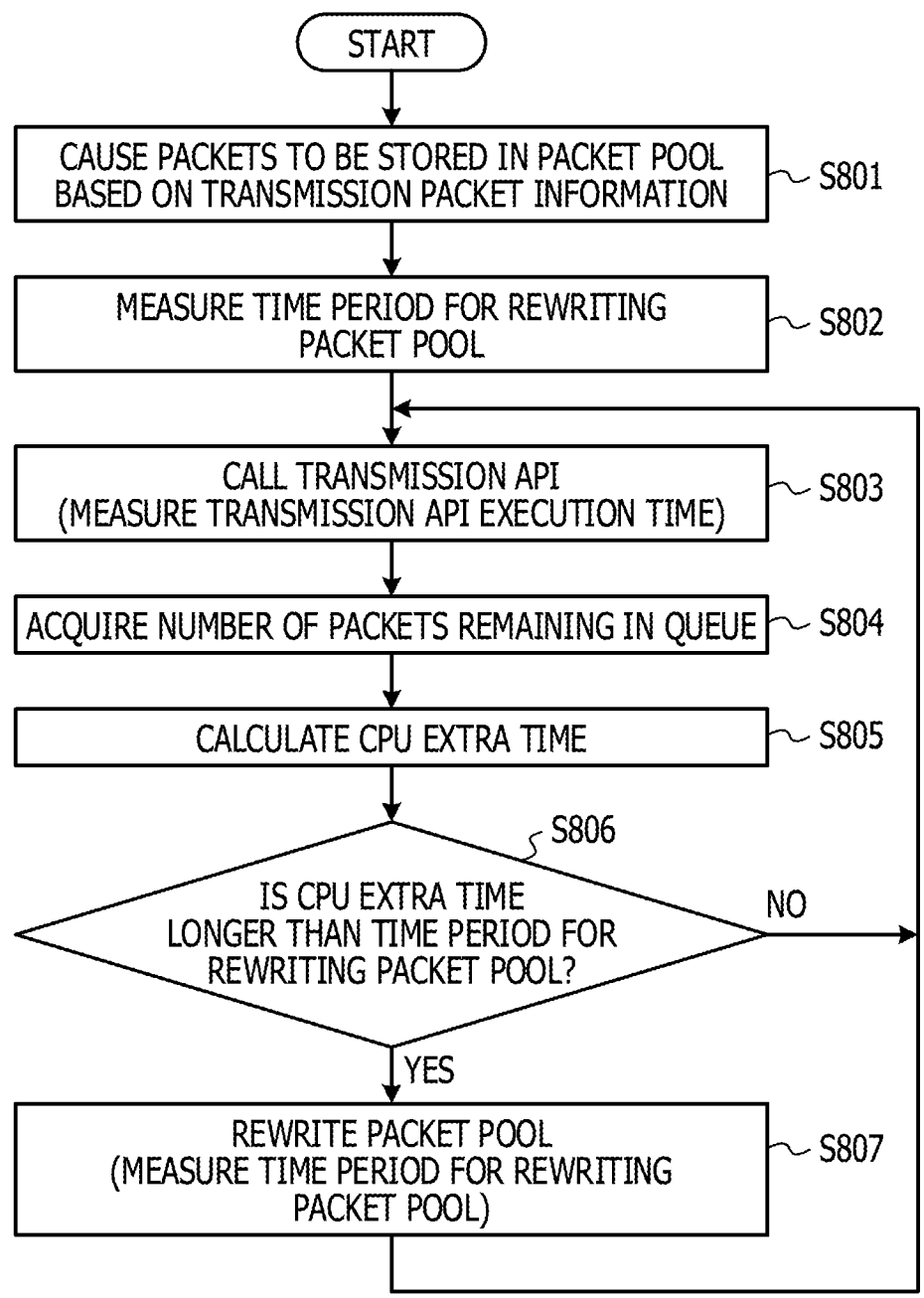
FIG. 8 is a flowchart illustrating an example of a packet transmission control process according to the first embodiment.

Next, packet transmission control related to the packet load generation according to the first embodiment is described. FIG. 8 is a flowchart illustrating an example of a packet transmission control process to be executed by the information processing device according to the first embodiment. The following describes an example in which the packet pool 314 may store 1000 packets and in which 10 packets are rewritten when a process of rewriting the packet pool 314 is executed once. In this example, the transmission API 331 transfers 32 packets to the NIC 350 in response to a single call to the transmission API 331.

The user sets, as the transmission packet information, a packet load to be applied to the device to be tested. The set transmission packet information is stored in the transmission packet information holder 317. Then, the packet transmission control process related to the packet load generation is started in response to a user operation.

When the packet transmission control process is started, the packet registering section 312 causes packets to be transmitted to the device to be tested to be stored in the packet pool 314 based on the transmission packet information held in the transmission packet information holder 317 in step S801. In addition, the packet registering section 312 updates the packet pool rewriting information held in the rewriting information holder 318. Since the information processing device is in an initial state and the packet pool 314 is empty before step S801, the packet registering unit 312 causes 1000 packets to be stored in the packet pool 314 in step S801.

For example, when the transmission packet information illustrated in FIG. 4 is held in the transmission packet information holder 317, 1000 packets are stored in the packet pool 314 as illustrated in FIG. 9A. Specifically, the following packets are stored: lengths of the packets to be transmitted are set to 64 bytes, a layer 4 (L4) protocol of the packets is set to the TCP, source IP addresses of the packets are set to 192.168.0.1 to 192.168.3.232, destination IP addresses of the packets are set to 192.170.1.1 to 192.170.4.232, source port numbers of the packets are set to 40001 to 41000, and destination port numbers of the packets are set to 50001 to 51000. The packet pool rewriting information held in the rewriting information holder 318 is updated to the information illustrated in FIG. 5.

Subsequently, in step S802, the packet registering section 312 executes a process of rewriting 10 packets stored in the packet pool 314 as a dummy process and measures a time period for rewriting the packet pool 314 in accordance with a registration instruction from the transmission task manager 311. Then, the packet registering section 312 causes the measured time period for rewriting the packet pool 314 to be stored as the rewriting execution time information in the rewriting execution time information holder 319.

Next, in step S803, the transmission task manager 311 instructs the transmission API caller 313 to transmit packets, and the transmission API caller 313 receives the instruction and calls the transmission API 331. Thus, the transmission API 331 causes information of 32 packets to be transmitted to be stored (enqueued) in the transmission descriptor (queue) 351 of the NIC 350 and transfers the corresponding 32 packets from the packet pool 314 to the transmission buffer 352 of the NIC 350. In addition, a time period for executing the process by the transmission API 331 is measured and transmission API execution time obtained as a result of measuring the time period for executing the process by the transmission API 331 is stored as the packet transmission API execution time information in the transmission API execution time information holder 320. After the NIC 350 receives the packets transferred from the transmission API 331, the NIC 350 dequeues the information of the packets from the transmission descriptor 351 and sequentially transmits the packets stored in the transmission buffer 352 to the communication line 130 connected to the device 120 to be tested.

Next, in step S804, the transmission task manager 311 acquires the number (or the number of packets remaining in the queue) of packets, which are to be transmitted and remain in the NIC 350, from the transmission descriptor (queue) 351 via the transmission descriptor monitoring section 316 and the remaining number acquisition API 332.

Subsequently, in step S805, the transmission task manager 311 calculates the CPU extra time that is a time period up to the time when the transmission of an unsent packet remaining in the NIC 350 to the device to be tested is completed. In this case, the transmission task manager 311 uses the following equation to calculates the CPU extra time based on the number, acquired in step S805, of packets remaining in the queue and the transmission API execution time acquired from the transmission API execution time holder 320. This example assumes that the maximum value among transmission API execution time stored in the transmission API execution time holder 320 is used as the transmission API execution time.

(The CPU extra time)=(the number of packets remaining in the queue)×(a time period for dequeuing a single packet)−(the transmission API execution time)

The time period for dequeuing a single packet is equal to a time period for transmitting a single packet from the NIC 350. As the time period for dequeuing a single packet, the minimum value that is calculated based on the following equation and conforms to each standard is used.

(The time period for dequeuing a single packet)={(a length of the packet to be transmitted)+(a preamble)+(an inter-packet gap)}/(a line speed)

For example, when the length of the packet to be transmitted in 10 Gbit Ethernet is 64 bytes, the preamble is 8 bytes, the inter-packet gap (IPG) is 96 bits, the time period for dequeuing a single packet is calculated by $\{(64+8)\times 8+96\}/(10\times 10^9)$ and is approximately 67 ns. In addition, for example, when the length of the packet to be transmitted in 10 Gbit Ethernet is 1518 bytes, the time period for dequeuing a single packet is calculated by $\{(1518+8)\times 8+96\}/(10\times 10^9)$ and is approximately 1230 ns.

Next, in step S806, the transmission task manager 311 compares the CPU extra time calculated in step S805 with the time period, acquired from the rewriting execution time holder 319, for rewriting the packet pool 314 and determines whether or not the CPU extra time is longer than the time period for rewriting the packet pool 314. In this case, as the time period for rewriting the packet pool 314, the maximum value among rewriting execution time stored in the rewriting execution time holder 319 is used.

When the transmission task manager 311 determines that the CPU extra time is longer than the time period for rewriting the packet pool 314 in step S806 (YES), the transmission task manager 311 instructs the packet registering section 312 to register (rewrite) packets, and the packet registering section 312 receives the instruction and rewrites the packet pool 314 in step S807. In addition, the packet registering section 312 measures a time period for rewriting the packet pool 314 and causes the measured time period for rewriting the packet pool 314 to be stored as the rewriting execution time information in the rewriting execution time holder 319.

For example, when the number, acquired in step S805, of packets remaining in the queue is 200 packets, the time period for dequeuing a single packet is 67 ns, and the transmission API execution time is 2211 ns as indicated in the example illustrated in FIG. 6, the CPU extra time is (200×67)−2211=11189 ns. In addition, it is assumed that the time period for rewriting the packet pool 314 is 10100 ns as indicated in the example illustrated in FIG. 7. In this case, since the CPU extra time (11189 ns)>the time period (10100 ns) for rewriting the packet pool 314, the transmission task manager 311 instructs the packet registering section 312 to register (rewrite) packets, and the packet pool 314 is rewritten.

In the process of step S807, the packet registering section 312 rewrites 10 packets stored in the packet pool 314 based on the transmission packet information held in the transmission packet information holder 317 and the packet pool rewriting information held in the rewriting information holder 318 and updates the packet rewriting information held in the rewriting information holder 318. The packet pool 314 is rewritten in accordance with the rewriting destination intra-pool index held as the packet pool rewriting information. After the rewriting, the rewriting destination intra-pool index is updated.

For example, in the packet pool rewriting executed first after the start of the packet transmission control process, information corresponding to 1000 packets is stored in the packet pool 314 as illustrated in FIG. 9B. Specifically, lengths of the packets to be transmitted are set to 64 bytes, a layer 4 (L4) protocol of the packets is set to the TCP, source IP addresses of the packets are set to 192.168.0.11 to 192.168.3.242, destination IP addresses of the packets are set to 192.170.1.11 to 192.170.4.242, source port numbers of the packets are set to 40011 to 41010, and destination port numbers are set to 50011 to 51010. The packet pool rewriting information is updated as illustrated in FIG. 10.

When the process of step S807 is terminated or when the transmission task manager 311 determines that the CPU extra time is not longer than the time period for rewriting the packet pool 314 in step S806 (NO), the process returns to step S803. Then, the processes of steps S803 and later are executed again.

When the transmission task manager 311 determines that the CPU extra time based on the number of packets remaining in the queue included in the NIC 350 is longer than the time period for rewriting a predetermined number of packets in the packet pool 314, the packet pool 314 may be rewritten so that the predetermined number of packets are rewritten in the packet pool 314 until the NIC 350 completes the transmission of packets to the device 120 to be tested. Thus, there may not exist a time period when a packet to be transmitted from the NIC 350 to the device 120 to be tested does not exist and when a packet is not transmitted from the information processing device to the device 120 to be tested, and the efficiency of transmitting packets may be improved. In addition, a reduction in the transmission API execution time for a single transmission in the calculation of the CPU extra time may inhibit a state in which the packet pool 314 instantaneously does not have any packet during a time period up to the enqueue of a next packet and in which a packet is not transmitted.

According to the TCP/IP, the uniqueness of connections is determined based on protocol numbers, source IP addresses, destination IP addresses, source port numbers, and destination port numbers. When values of each type of these parameters are the same, communication is executed in the same connection. Specifically, when one or more of values of any type of these parameters are different from the other values, communication is executed in different connections. Thus, to generate packets for multiple connections, it is sufficient if one or more parameter values among the aforementioned parameters are rewritten, instead of the rewriting of all packets. However, since checksums to be used to confirm the normality of packets are to be rewritten, the checksums are recalculated and checksum fields are rewritten in the rewriting of the packets.

For example, in the first embodiment, in the rewriting of the packet pool 314, a time period for rewriting the packet pool 314 may be reduced by rewriting only IP addresses and port numbers that are used to generate packets for multiple connections, instead of the rewriting of all packets. In the first embodiment, since IP addresses and port numbers are changed, the normality of packets is maintained by recalculating and updating checksums.

For example, as illustrated in FIG. 11A, an IPv4 packet includes a layer 2 (L2) header (Ethernet header) 1101, a layer 3 (L3) header (IPv4 header) 1102, a layer 4 (L4) header (TCP or UDP header) 1103, payload data 1104, and a frame check sequence (FCS) 1105. The IPv4 packet is changed to a packet for another connection by rewriting one or more of values in fields for a source IP address (IPSA) 1111 and destination IP address (IPDA) 1112 of the layer 3 (L3) header 1102 and values in fields for a source port number (SrcPort) 1121 and destination port number (DstPort) 1122 of the layer 4 (L4) header 1103. In the first embodiment, since one or more of these values are rewritten, the normality of the packet is maintained by recalculating one or more of values stored in fields for a checksum (Chksum) 1113 of the layer 3 (L3) header 1102 and a checksum (Chksum) 1123 of the layer 4 (L4) header 1103.

In addition, for example, as illustrated in FIG. 11B, an IPv6 packet includes a layer 2 (L2) header (Ethernet header) 1151, a layer 3 (L3) header (IPv6 header) 1152, a layer 4 (L4) header (TCP or UDP header) 1153, payload data 1154, and a frame check sequence (FCS) 1155. The IPv6 packet is changed to a packet for another connection by rewriting one or more of values in fields for a source IP address (IPSA) 1161 and destination IP address (IPDA) 1162 of the layer 3 (L3) header 1152 and values in fields for a source port number (SrcPort) 1171 and destination port number (DstPort) 1172 of the layer 4 (L4) header 1153. In the first embodiment, since one or more of these values are rewritten, the normality of the packet is maintained by recalculating a value stored in a field for a checksum (Chksum) 1173 of the layer 4 (L4) 1153.

Second Embodiment

Next, a second embodiment is described.

The information processing device according to the first embodiment sets the number of packets to be rewritten once to a fixed number (10 in the aforementioned example) in the rewriting of the packet pool. In the rewriting of the packet pool, however, as the number of packets to be collectively rewritten is larger, the efficiency of the rewriting is more effective. For example, when the number of packets to be rewritten in the packet pool is 1, the rewriting destination intra-pool index is updated so that the value of the rewriting destination intra-pool index is increased one by one. When the number of packets to be rewritten in the packet pool is N, the rewriting destination intra-pool index is updated so that the value of the rewriting destination intra-pool index is increased by N in the rewriting executed once. Thus, the frequency at which a process of updating the packet pool rewriting information is executed may be reduced and the efficiency of the process may be improved.

Thus, an information processing device according to the second embodiment calculates an appropriate number of packets to be rewritten based on a time period for rewriting the packet pool, the size of the transmission descriptor (queue), and the like without fixing the number of packets to be rewritten once in the packet pool. Then, packets that are to be rewritten and whose number has been calculated are rewritten in the rewriting executed once in the packet pool.

A hardware configuration, software configuration, and functional configuration of the information processing device according to the second embodiment are different from those of the information processing device according to the first embodiment in that the number of packets to be rewritten once in the packet pool is changeable in the information processing device according to the second embodiment. For example, as the number of packets to be rewritten in the packet pool rewriting information, a calculated number of packets to be rewritten is set. In addition, the packet registering section 312 rewrites, in accordance with a registration instruction from the transmission task manager 311, packets whose number is equal to a number set as the number of packets to be rewritten. In addition, the rewriting execution time holder 319 holds rewriting execution time information enabling a time period for rewriting a single packet to be calculated so that the rewriting execution time information is associated with the number of packets to be rewritten and is stored in the rewriting execution time holder 319. Other features of the information processing device according to the second embodiment are the same as or similar to those of the information processing device according to the first embodiment, and a description thereof is omitted.

Figure 12:
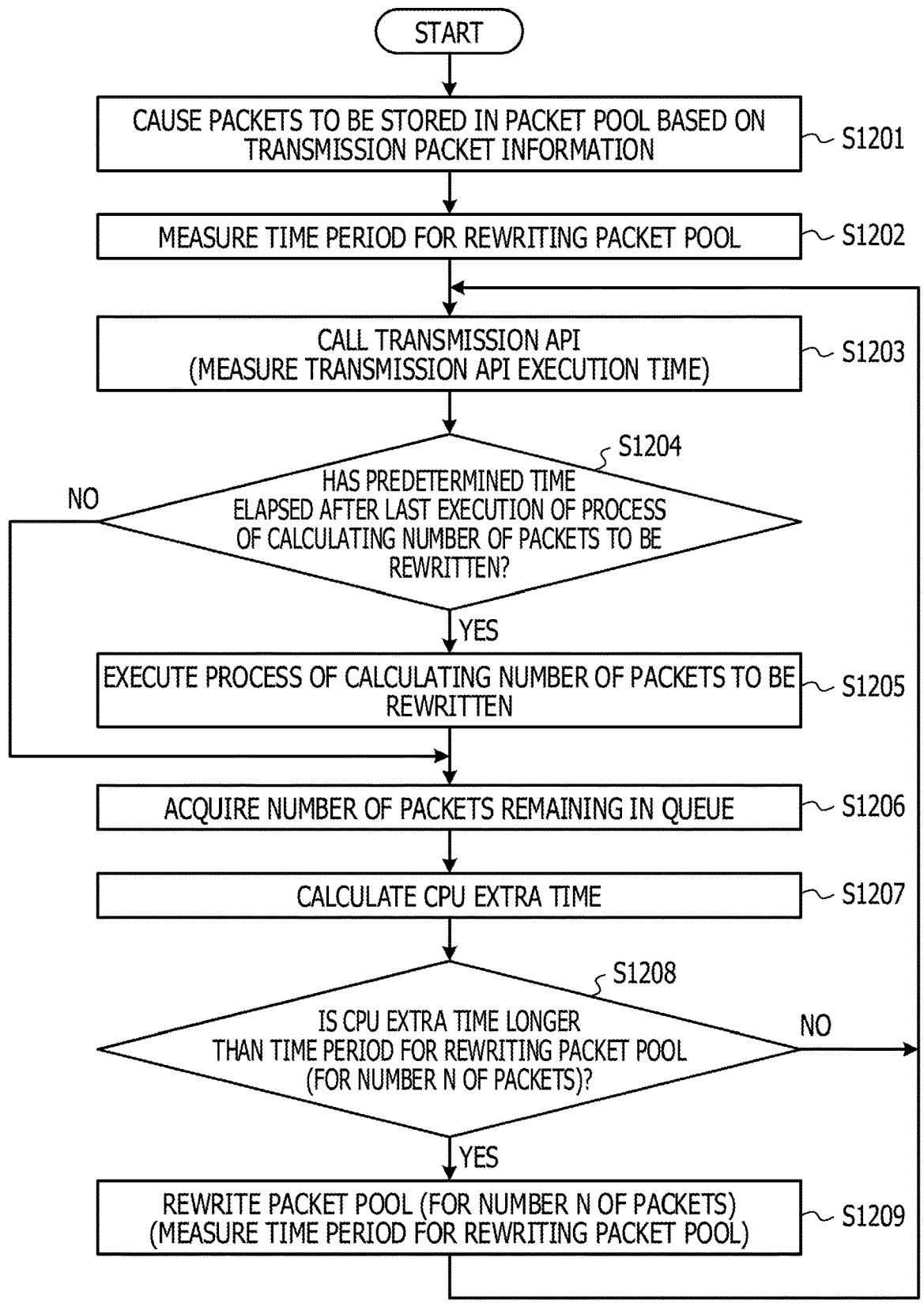
FIG. 12 is a diagram illustrating an example of a packet transmission control process according to a second embodiment.

Packet transmission control related to packet load generation according to the second embodiment is described below. FIG. 12 is a flowchart illustrating an example of a packet transmission control process to be executed by the information processing device according to the second embodiment. As an example, the following description assumes that the packet pool 314 may store 1000 packets and that the transmission API 331 transfers 32 packets to the NIC 350 in response to a single call to the transmission API 331.

The user sets, as the transmission packet information, a packet load to be applied to the device to be tested. The set transmission packet information is stored in the transmission packet information holder 317. Then, the packet transmission control process related to the packet load generation is started in response to a user operation. When the packet transmission control process is started, the packet registering section 312 causes packets to be transmitted to the device to be tested to be stored in the packet pool 314 based on the transmission packet information held in the transmission packet information holder 317 and updates the packet pool rewriting information held in the rewriting information holder 318 in step S1201 in the same manner as the first embodiment.

Subsequently, in step S1202, the packet registering section 312 executes a process of rewriting a packet in the packet pool 314 as a dummy process in accordance with a registration instruction from the transmission task manager 311. In step S1202, the packet registering section 312 rewrites, as dummy rewriting, packets whose number corresponds to an initial value of a number N (for example, N=10) of packets to be rewritten. In addition, the packet registering section 312 measures a time period for rewriting the packet pool and causes the measured time period for rewriting the packet pool to be stored as the rewriting execution time information in the rewriting execution time holder 319.

Next, in step S1203, the transmission task manager 311 instructs the transmission API caller 313 to transmit packets, and the transmission API caller 313 receives the instruction and calls the transmission API 331. Thus, the transmission API 331 causes information of 32 packets to be transmitted to be stored (enqueued) in the transmission descriptor (queue) 351 of the NIC 350 and transfers the corresponding 32 packets from the packet pool 314 to the transmission buffer 352 of the NIC 350. In addition, a time period for executing a process by the transmission API 331 is measured and transmission API execution time obtained as a result of measuring the time period for executing the process by the transmission API 331 is stored as the packet transmission API execution time information in the transmission API execution time holder 320.

Next, in step S1204, the transmission task manager 311 determines whether or not predetermined time (of, for example, 1 second) has elapsed after the last (latest) execution of the process of calculating the number of packets to be rewritten. When the transmission task manager 311 determines that the predetermined time has elapsed after the last execution of the process of calculating the number of packets to be rewritten in step S1204 (YES), the transmission task manager 311 executes the process of calculating the number of packets to be rewritten in order to calculate an appropriate number of packets to be rewritten in step S1205. When the transmission task manager 311 determines that the predetermined time has not elapsed after the last execution of the process of calculating the number of packets to be rewritten in step S1204 (NO), the process skips step S1205 and proceeds to S1206.

Figure 13:
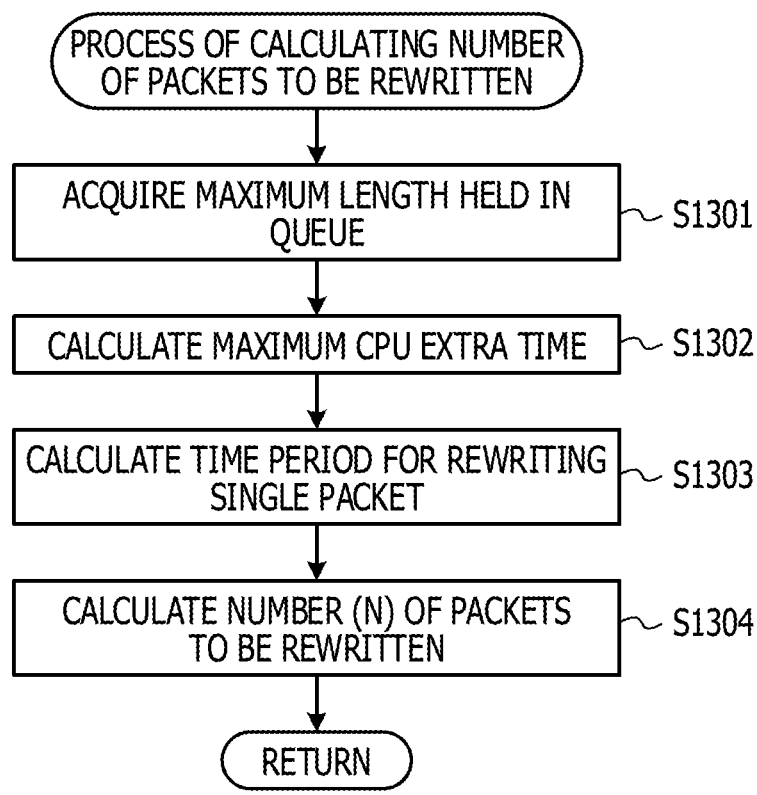
FIG. 13 is a flowchart illustrating an example of a process of calculating the number of packets to be rewritten according to the second embodiment.

FIG. 13 is a flowchart illustrating an example of the process of calculating the number of packets to be rewritten in step S1205. When the process of calculating the number of packets to be rewritten is started, the transmission task manager 311 acquires the maximum length (or the size of the queue) held in the transmission descriptor (queue) in step S1301. For example, information of the maximum length held in the queue may be acquired from a system setting or the like.

Next, in step S1302, the transmission task manager 311 calculates the maximum possible CPU extra time. The transmission task manager 311 uses the following equation to calculate the maximum CPU extra time based on information of the maximum length acquired in step S1301 and held in the queue and the transmission API execution time acquired from the transmission API execution time holder 320.

(The maximum CPU extra time)=(the maximum length held in the queue)×$M$×(a time period for dequeuing a single packet)−(the transmission API execution time)

In this case, M is a multiplier to be used to set a margin for the maximum length held in the queue. For example, when a margin of 10% is used, M=0.90.

Next, in step S1303, the transmission task manager 311 calculates a time period for rewriting a single packet in the packet pool 314 based on the time period, acquired from the rewriting execution time holder 319, for rewriting the packet pool. The time period for rewriting a single packet is calculated using the maximum value among rewriting execution time stored in the rewriting execution time holder 319.

Subsequently, in step S1304, the transmission task manager 311 uses the following equation to calculate a number N of packets to be rewritten based on the maximum CPU extra time calculated in step S1302 and the time period, calculated in step S1303, for rewriting a single packet.

(The number of packets to be rewritten)=(the maximum CPU extra time)/(the time period for rewriting a single packet)

After the appropriate number N of packets to be rewritten is calculated, the process returns to step S1206 illustrated in FIG. 12.

For example, when the maximum length acquired in step S1301 and held in the queue is 500 packets, a time period for dequeuing a single packet is 67 ns, the transmission API execution time is 2211 ns as indicated in the example illustrated in FIG. 6, and the margin is 10%, the maximum CPU extra time is (450×0.90×67)−2211=27939 ns. In addition, the time period for rewriting the packet pool is equal to a time period for rewriting 10 packets in the packet pool and is 10100 ns as indicated in the example illustrated in FIG. 7, the time period for rewriting a single packet is (10100/10) =1010 ns. In this example, the calculated number N of packets to be rewritten is (27939/1010)=27.

Returning to FIG. 12, in step S1206, the transmission task manager 311 acquires, from the transmission descriptor (queue) 351 via the transmission descriptor monitoring section 316 and the remaining number acquisition API 332, the number (or the number of packets remaining in the queue) of packets remaining in the NIC 350 and to be transmitted. Next, in step S1207, the transmission task manager 311 calculates the CPU extra time in the same manner as the first embodiment.

Next, in step S1208, the transmission task manager 311 determines whether or not the CPU extra time calculated in step S1207 is longer than the time period for rewriting the number N of packets in the packet pool. When the transmission task manager 311 determines that the CPU extra time is longer than the time period for rewriting the number N of packets in the packet pool in step S1208 (YES), the transmission task manager 311 instructs the packet registering section 312 to register (rewrite) packets, and the packet registering section 312 receives the instruction and rewrites the packet pool 314 in step S1209. In addition, the packet registering section 312 measures a time period for rewriting the packet pool 314 and causes the measured time period for rewriting the packet pool to be stored as the rewriting execution time information in the rewriting execution time holder 319.

For example, when the calculated number N of packets to be rewritten is 27 as described in the example, and the CPU extra time exceeds a time period (27270 ns) for rewriting 27 packets, the transmission task manager 311 instructs the packet registering section 312 to register (rewrite) packets, and the packet registering section 312 rewrites 27 packets in the packet pool 314.

In the process of step S1209, the packet registering unit 312 rewrites the number N of packets in the packet pool 314 based on the transmission packet information held in the transmission packet information holder 317 and the packet pool rewriting information held in the rewriting information holder 318 and updates the packet pool rewriting information held in the rewriting information holder 318. In this case, the packet pool 314 is rewritten in accordance with the rewriting destination intra-pool index held as the packet pool rewriting information, and the rewriting destination intra-pool index is updated so that the value of the rewriting destination intra-pool index is increased by N after the rewriting.

When the process of step S1207 is terminated or when the transmission task manager 311 determines that the CPU extra time is not longer than the time period for rewriting the packet pool in step S1208 (NO), the process returns to step S1203. Then, the processes of S1203 and later are executed again.

According to the second embodiment, packets may be rewritten in the packet pool 314 until the NIC 350 completely transmits packets to the device 120 to be tested, there may not exist a time period when the NIC 350 does not have a packet to be transmitted to the device 120 to be tested and when a packet is not transmitted from the information processing device to the device to be tested, and the efficiency of transmitting packets may be improved. In addition, the process may be efficiently executed by calculating an appropriate number of packets to be rewritten based on a time period for rewriting the packet pool, the size of the transmission descriptor (queue), and the like and by rewriting the packet pool 314. Furthermore, the packet pool 314 may be efficiently rewritten by periodically calculating an appropriate number of packets to be rewritten.

Third Embodiment

Next, a third embodiment is described.

Figure 14:
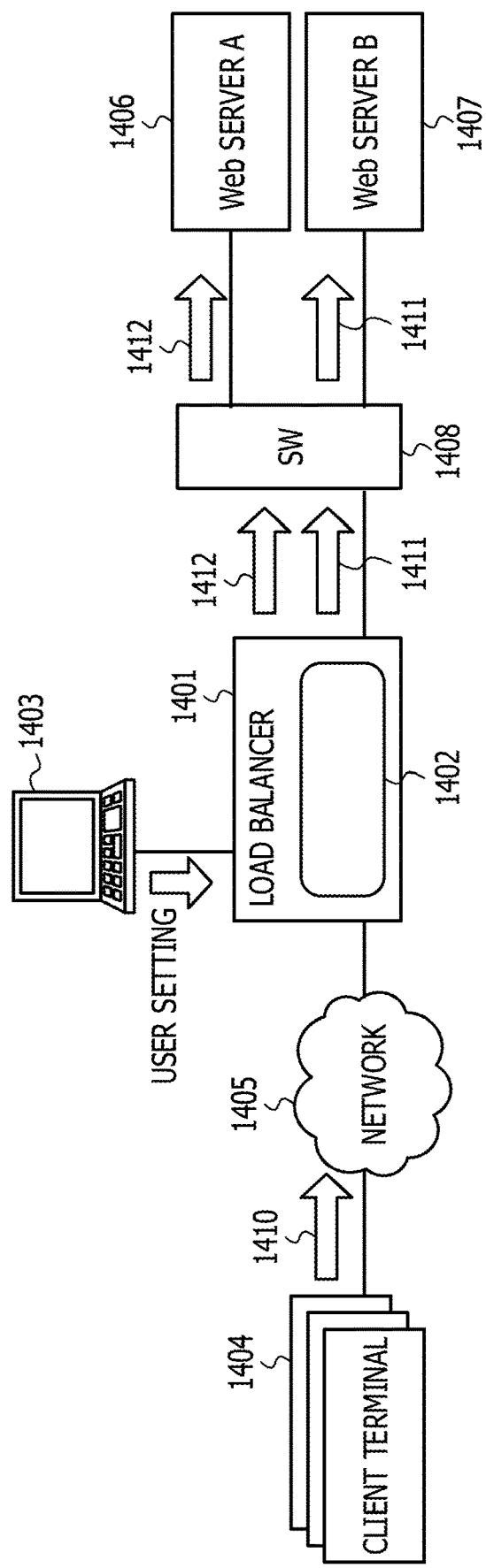
FIG. 14 is a diagram illustrating an example of a configuration of an information processing system according to a third embodiment.

FIG. 14 is a diagram illustrating an example of a configuration of an information processing system according to the third embodiment. The information processing system according to the third embodiment is configured to apply a technique for rewriting a packet to packet transfer control of a load balancer and execute load distribution in the system.

As illustrated in FIG. 14, the information processing system according to the third embodiment includes a load balancer 1401 for executing control related to the load distribution. The load balancer 1401 includes an information processing device 1402 that rewrites packets. The information processing device 1402 is configured in the same manner as the information processing device according to the first embodiment illustrated in FIG. 3. Setting information is input to the load balancer 1401 from a user terminal 1403. The load balancer 1401 is connected to client terminals 1404 via a network 1405. In addition, the load balancer 1401 is connected to a web server A 1406 and a web server B 1407 via a switch 1408.

First, the user terminal 1403 sets, in the load balancer 1401, setting information (rule) on the rewriting of an IP address. The setting information is held in the transmission packet information holder 317 of the information processing device 1402. When communication is executed in the information processing system, the load balancer 1401 determines whether or not packet rewriting is executed on a connection basis. For example, when two connections are detected, the rewriting is executed on one of the detected connections.

For example, when a packet 1410 is transmitted from a client terminal 1404 toward the web server B, the load balancer 1401 receives the packet 1410 and causes the received packet 1410 to be stored in the packet pool 314 of the information processing device 1402. Then, the transmission task manager 311 of the information processing device 1402 calculates the CPU extra time, compares the calculated CPU extra time with a time period for rewriting the packet pool. When the transmission task manager 311 determines that the CPU extra time is longer than the time period for rewriting the packet pool, the transmission task manager 311 rewrites a destination IP address of the packet 1410 for the connection targeted for the rewriting so that the destination IP address is changed from the web server B to the web server A.

Thus, the destination of the packet 1410 transmitted from the client terminal 1404 toward the web server B in the connection targeted for the rewriting is rewritten, and the packet 1410 is distributed into a packet 1411 to be transmitted to the web server B and a packet 1412 that is to be transmitted to the web server A and whose destination has been rewritten. In this manner, the information processing device 1402 included in the load balancer 1401 rewrites the destination IP address of communication specified by a user for the packet 1410 transmitted from the client terminal 1404 toward the web server B, thereby distributing a load to the web server A 1406 and the web server B 1407.

The processes to be executed by the information processing devices according to the aforementioned embodiments may be executed by causing a computer (including a server device) to execute a program, for example. In addition, a computer-readable storage medium storing the program is applicable to the embodiments. As the storage medium, a flexible disk, a hard disk, an optical disc, a magneto-optical disc, a CD-ROM, a magnetic tape, a nonvolatile memory card, a ROM, or the like may be used, for example.

In addition, a program product that causes the computer to execute the program and execute the processes and enables the functions described in the embodiments is applicable to the embodiments. As the program product, the program for enabling the functions described in the embodiments or the computer into which the program is read may be used, for example. In addition, as the program product, a transmitting device for giving the program to the computer connected to and configured to communicate with the transmitting device via a network, a network system including the transmitting device, or the like may be used.

In addition, when the functions described in the embodiments are enabled by the supplied program and an operating system (OS) executed in the computer, another application executed in the computer, or the like, the program is applicable to the embodiments. In addition, when all or one or more of the processes of the supplied program are executed by a function-extended unit of the computer to enable the functions described in the embodiment, the program is applicable to the embodiments. Furthermore, all or a portion of the program may be executed by another computer to use the embodiments in a network environment.

The embodiments are examples in which the techniques disclosed herein are enabled. Thus, the scope of the techniques disclosed herein is not to be narrowly interpreted by the embodiments. In other words, the techniques disclosed herein may be implemented in various forms without departing from the technical idea or main features of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A packet load generation device comprising:
a first memory configured to store a first packet group including a first plurality of packets;
a network interface circuit including a second memory to be used as a transmission buffer, the second memory being configured to store a second packet group including a second plurality of packets, the network interface circuit being configured to transmit a signal to a target apparatus via a communication network by using the second packet group stored in the second memory; and
a processor coupled to the first memory and the network interface circuit, the first memory being a memory outside the network interface circuit, the processor being configured to:
estimate a first time length taken for the network interface circuit to output the second packet group stored in the second memory from the network interface circuit to the communication network;
estimate a second time length taken for the processor to generate and add a third plurality of packets into the first packet group stored in the first memory;
obtain a comparison result by comparing the first time length with the second time length;
in response to the comparison result indicating that the first time length is longer than the second time length, perform addition of the third plurality of packets to the first packet group stored in the first memory; and
in response to the comparison result indicating that the first time length is less than the second time length, perform addition of the first plurality of packets into the second packet group stored in the second memory of the network interface circuit by causing the first plurality of packets stored in the first memory to be sequentially moved to the network interface circuit.

2. The packet load generation device according to claim 1, wherein the first time length is estimated in accordance with a number of packets included in the second plurality of packets and a time length for transmitting a single packet.

3. The packet load generation device according to claim 1, wherein the adding of the third plurality of packets is configured to generate the third plurality of packets by modifying at least an address or a port number of a packet included in the first plurality of packets.

4. The packet load generation device according to claim 3, wherein the adding of the third plurality of packets is configured to recalculate checksum values in accordance with the modified at least the address or the port number of the packet, and register the recalculated checksum values.

5. The packet load generation device according to claim 1, wherein the processor is configured to add packets to the first packet group in accordance with set transmission packet information.

6. The packet load generation device according to claim 1, wherein a total number of packets included in the third plurality of packets to be added is calculated on the basis of a total number of packets included in the second plurality of packets and a time length for adding a single packet to the first packet group.

7. The packet load generation device according to claim 1, wherein the first time length includes a time length for transmitting the first plurality of packets to the second packet group.

8. A packet load generation method implemented by a packet load generation device, the packet load generation device including: a first memory configured to store a first packet group including a first plurality of packets; a network interface circuit including a second memory configured to store a second packet group including a second plurality of packets, the network interface circuit being configured to transmit a signal to a target apparatus via a communication network by using the second packet group stored in the second memory; and a processor coupled to the first memory and the network interface circuit, the first memory being a memory outside the network interface circuit, the packet load generation method comprising:

estimating, by the processor of the packet load generation device, a first time length taken for the network interface circuit to output the second packet group stored in the second memory from the network interface circuit to the communication network;

estimating a second time length taken for the processor to generate and add a third plurality of packets into the first packet group stored in the first memory;

obtaining a comparison result by comparing the first time length with the second time length;

in response to the comparison result indicating that the first time length is longer than the second time length, adding the third plurality of packets to the first packet group stored in the first memory; and in response to the comparison result indicating that the first time length is less than the second time length, performing addition of the first plurality of packets into the second packet group stored in the second memory of the network interface circuit by causing the first plurality of packets stored in the first memory to be sequentially moved to the network interface circuit.

9. The packet load generation method according to claim 8, wherein the first time length is estimated in accordance with a number of packets included in the second plurality of packets and a time length for transmitting a single packet.

10. The packet load generation method according to claim 8, wherein the adding of the third plurality of packets is configured to generate the third plurality of packets by modifying at least an address or a port number of a packet included in the first plurality of packets.

11. The packet load generation method according to claim 10, wherein the adding of the third plurality of packets is configured to recalculate checksum values in accordance with the modified at least the address or the port number of the packet, and register the recalculated checksum values.

12. The packet load generation method according to claim 8, further comprising: adding packets to the first packet group in accordance with set transmission packet information.

13. The packet load generation method according to claim 8, wherein a total number of packets included in the third plurality of packets to be added is calculated on the basis of a total number of packets included in the second plurality of packets and a time length for adding a single packet to the first packet group.

14. The packet load generation method according to claim 8, wherein the first time length includes a time length for transmitting the first plurality of packets to the second packet group.

15. A non-transitory computer-readable medium storing instructions executable by a load generation device, the load generation device including: a first memory configured to store a first packet group including a first plurality of packets; a network interface circuit including a second memory configured to store a second packet group including a second plurality of packets, the network interface circuit being configured to transmit a signal to a target apparatus via a communication network by using the second packet group stored in the second memory; and a processor coupled to the first memory and the network interface circuit, the first memory being a memory outside the network interface circuit, the processor being configured to execute the instructions, the instructions comprising:

estimating a first time length taken for the network interface circuit to output the second packet group stored in the second memory from the network interface circuit to the communication network;

estimating a second time length taken for the processor to generate and add a third plurality of packets into the first packet group stored in the first memory;

obtaining a comparison result by comparing the first time length with the second time length;

in response to the comparison result indicating that the first time length is longer than the second time length, adding the third plurality of packets to the first packet group stored in the first memory; and in response to the comparison result indicating that the first time length is less than the second time length, performing addition of the first plurality of packets into the second packet group stored in the second memory of the network interface circuit by causing the first plurality of packets stored in the first memory to be sequentially moved to the network interface circuit.

\* \* \* \* \*